United States Patent
Kano et al.

(10) Patent No.: US 11,079,579 B2
(45) Date of Patent: Aug. 3, 2021

(54) IMAGE FORMING OPTICAL SYSTEM, AND IMAGING APPARATUS AND PROJECTING APPARATUS HAVING THE SAME

(71) Applicant: CANON KABUSHIKI KAISHA, Tokyo (JP)

(72) Inventors: Hiroto Kano, Utsunomiya (JP); Yu Miyajima, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 272 days.

(21) Appl. No.: 16/210,520

(22) Filed: Dec. 5, 2018

(65) Prior Publication Data

US 2019/0107696 A1 Apr. 11, 2019

Related U.S. Application Data

(63) Continuation of application No. PCT/JP2017/020716, filed on Jun. 2, 2017.

(30) Foreign Application Priority Data

Jun. 8, 2016 (JP) .............................. JP2016-114806
Nov. 28, 2016 (JP) .............................. JP2016-230703

(51) Int. Cl.
*G02B 17/00* (2006.01)
*G02B 17/06* (2006.01)
(Continued)

(52) U.S. Cl.
CPC ......... *G02B 17/0647* (2013.01); *G02B 13/16* (2013.01); *G02B 17/08* (2013.01); *G02B 17/0836* (2013.01); *G03B 21/28* (2013.01)

(58) Field of Classification Search
CPC .... G03B 17/0647; G03B 13/16; G03B 17/08; G03B 17/0836; G03B 21/28; G03B 17/00; G03B 17/082
(Continued)

(56) References Cited

U.S. PATENT DOCUMENTS 8,052,283 B2 * 11/2011 Imaoka ................. G02B 13/16
353/78
8,643,824 B2 * 2/2014 Mann ................. G02B 17/0892
355/67
(Continued)

FOREIGN PATENT DOCUMENTS

JP 2003-075767 A 3/2003
JP 2004-061960 A 2/2004
(Continued)

*Primary Examiner* — Arnel C Lavarias
(74) *Attorney, Agent, or Firm* — Canon U.S.A., Inc. IP Division

(57) ABSTRACT

An image forming optical system 1 includes, in order from an enlargement side, a first optical system 111 having a reflecting surface, and a second optical system 112 having a refracting surface. The image forming optical system 1 is configured to form an intermediate image 104 between the first optical system 111 and the second optical system 112. The first optical system 111 includes, in order from the enlargement side, a first reflecting group 113 having at least one reflecting surface having negative power, and a second reflecting group 114 having a plurality of reflecting surfaces 116 and 117 having positive power. The at least one reflecting surface having negative power includes a reflecting surface 115 closest to the enlargement side in the first reflecting group 113. An absolute value of power of the reflecting surface 115 is smallest in the first optical system 111.

19 Claims, 19 Drawing Sheets

(51) Int. Cl.
*G02B 13/16* (2006.01)
*G02B 17/08* (2006.01)
*G03B 21/28* (2006.01)

(58) Field of Classification Search
USPC ....... 359/366, 362, 363, 364, 365, 850, 857, 359/858, 859, 861
See application file for complete search history.

(56) References Cited

U.S. PATENT DOCUMENTS

| | | | |
|---|---|---|---|
| 10,466,452 B2* | 11/2019 | Minefuji | G02B 13/18 |
| 10,466,578 B2* | 11/2019 | Amano | G03B 21/147 |
| 10,701,251 B2* | 6/2020 | Aoki | H04N 5/2254 |
| 2003/0133082 A1 | 7/2003 | Sunaga | |
| 2004/0027544 A1 | 2/2004 | Chatani et al. | |
| 2006/0140635 A1 | 6/2006 | Yamamoto | |
| 2006/0164605 A1 | 7/2006 | Kuwa | |
| 2006/0221307 A1 | 10/2006 | Imaoka et al. | |
| 2010/0208364 A1 | 8/2010 | Minefuji | |
| 2010/0238416 A1* | 9/2010 | Kuwata | G03B 21/10 |
| | | | 353/69 |

FOREIGN PATENT DOCUMENTS

| | | |
|---|---|---|
| JP | 2006-138882 A | 6/2006 |
| JP | 2006-184775 A | 7/2006 |
| JP | 2006-276336 A | 10/2006 |
| JP | 2008-250296 A | 10/2008 |
| JP | 2009-157223 A | 7/2009 |
| JP | 2010-186120 A | 8/2010 |
| WO | 2017/033445 A1 | 3/2017 |

* cited by examiner

IMAGE FORMING OPTICAL SYSTEM, AND IMAGING APPARATUS AND PROJECTING APPARATUS HAVING THE SAME

CROSS-REFERENCE TO RELATED APPLICATIONS

This application is a Continuation of International Patent Application No. PCT/JP2017/020716, filed Jun. 2, 2017, which claims the benefit of Japanese Patent Application No. 2016-114806, filed Jun. 8, 2016, and Japanese Patent Application No. 2016-230703, filed Nov. 28, 2016, all of which are hereby incorporated by reference herein in their entirety.

TECHNICAL FIELD

The present invention relates to an image forming optical system, and is suitable for an imaging apparatus that obtains images and a projecting apparatus that projects images, for example.

BACKGROUND ART

There conventionally are known image forming systems, used in optical apparatuses such as imaging apparatuses and projecting apparatuses, which have reflecting optical elements such as mirrors and the like and refracting optical elements such as lenses and the like.

PTL 1 describes a projecting optical system made up of one or more mirrors including a concave reflecting surface and multiple lenses. PTL 1 attempts to reduce the size of the projecting optical system and obtain high resolution by appropriately setting the distance from the reflecting surface closest to the enlargement side to the display surface of a display element, and the distance from the optical axis to the farthest portion in the display surface.

PTL 2 describes a projecting optical system made up of a mirror including a convex reflecting surface and a mirror including a concave reflecting surface, and multiple lenses. PTL 2 attempts to widen the angle of the projecting optical system and reduce the size thereof by appropriately setting the placement of the mirrors and the focal length.

CITATION LIST

Patent Literature

PTL 1 Japanese Patent Laid-Open No. 2008-250296
PTL 2 Japanese Patent Laid-Open No. 2009-157223

However, in the projecting optical system described in PTL 1, the reflecting surface closest at the enlargement side is concave, so a large reflecting surface is necessary to realize a wide angle. Note that the angle can be widened while suppressing increase in size of the reflecting surface by increasing the curvature of the reflecting surface, but a greater number of lenses to correct increase in aberration as a result thereof is necessary, so reduction in size of the overall system is difficult.

Also, in the projecting optical system described in PTL 2, only one concave reflecting surface is provided, so correction of both aberration occurring at the convex reflecting surface and aberration occurring at the multiple lenses cannot be performed well. A greater number of lenses is necessary to correct each aberration, so reduction in size of the overall system is difficult.

SUMMARY OF INVENTION

It has been found to be desirable to provide an image forming optical system that has a wide angle and is compact in size, while having high optical capabilities, and an imaging apparatus and projecting apparatus having the image forming optical system.

According to an aspect of the present invention, an image forming optical system includes, in order from an enlargement side, a first optical system having a reflecting surface and a second optical system having a refracting surface. The image forming optical system is configured to form an intermediate image between the first optical system and the second optical system. The first optical system includes, in order from the enlargement side, a first reflecting group having at least one reflecting surface having negative power, and a second reflecting group having a plurality of reflecting surfaces having positive power. The at least one reflecting surface having negative power includes a reflecting surface closest to the enlargement side in the first reflecting group. An absolute value of power of the reflecting surface closest to the enlargement side in the first reflecting group is smallest in the first optical system.

Further features of the present invention will become apparent from the following description of exemplary embodiments with reference to the attached drawings.

DESCRIPTION OF EMBODIMENTS

Figure 1:
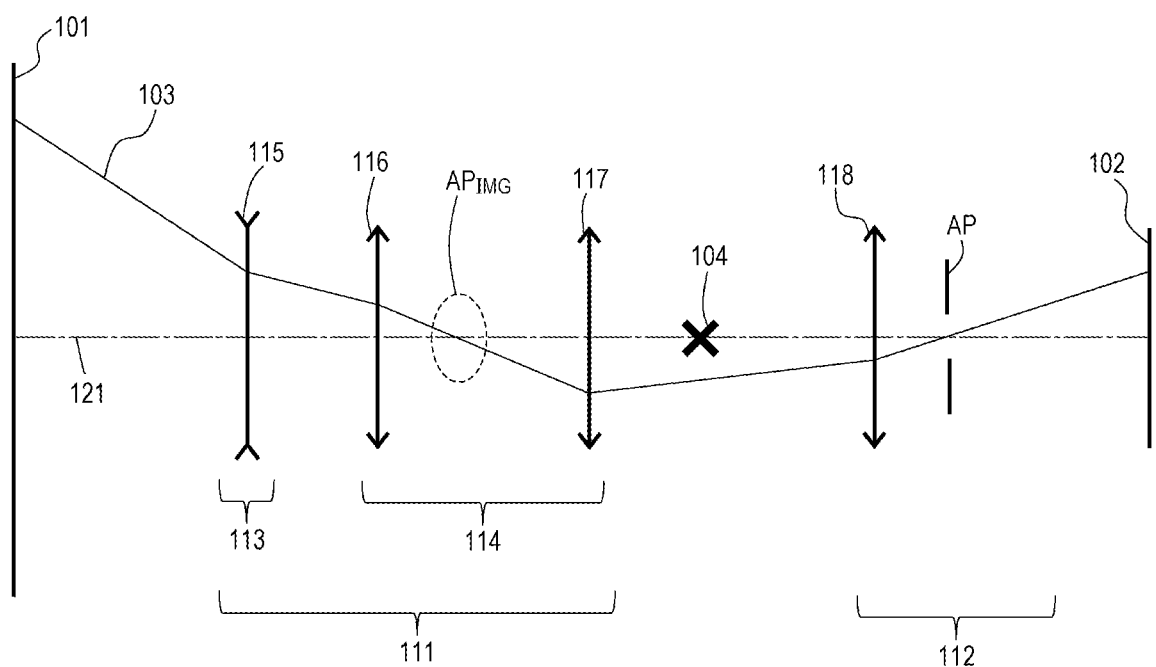
FIG. 1 is a power layout diagram of an image forming optical system according to an embodiment of the present invention.

An embodiment of the present invention will be described below with reference to the drawings. Note that the drawings may not be drawn to actual scale, for sake of convenience. Members that are the same are denoted by the same reference numerals in the drawings, and redundant description will be omitted.

Figure 2:
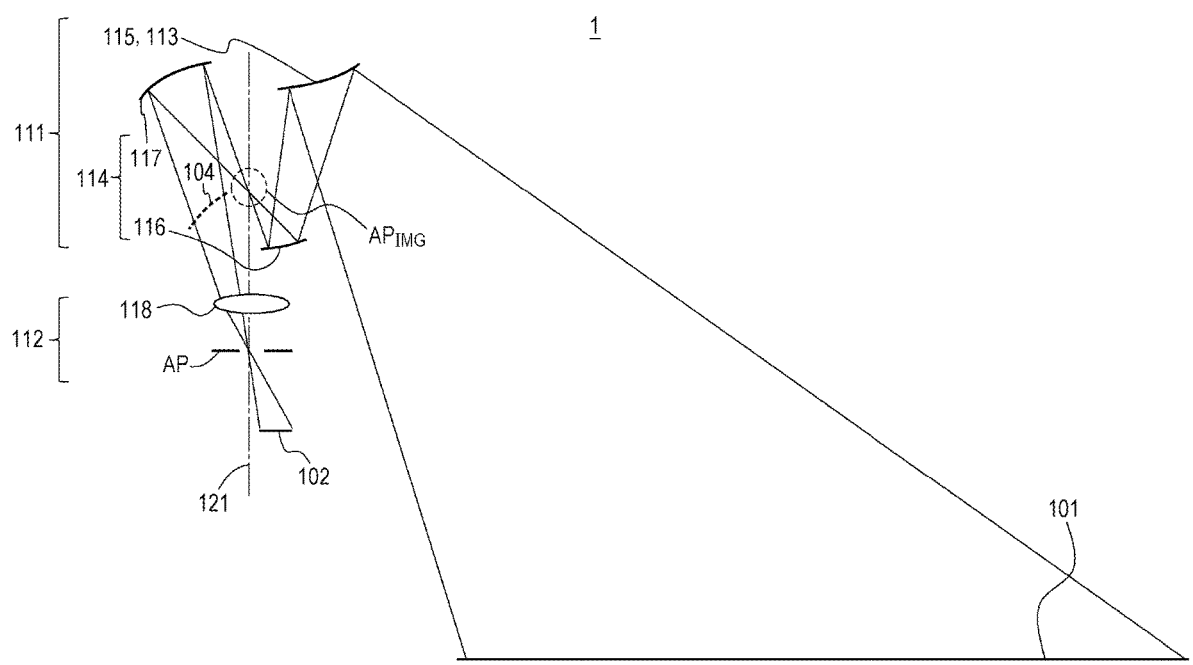
FIG. 2 is a schematic diagram of principal portions of the image forming optical system according to the embodiment of the present invention.

FIG. 1 is a power layout diagram of an image forming optical system 1 according to an embodiment of the present invention, and FIG. 2 is a schematic diagram of principal portions (cross-sectional view including optical axis), schematically illustrating the image forming optical system 1. Note that in FIGS. 1 and 2, a single-dot dashed line 121 indicates the optical axis of a later-described second optical system 112, and a broken line $AP_{IMG}$ indicates the position of an image of a later-described aperture diaphragm AP (aperture image). A solid line 103 in FIG. 1 indicates a paraxial ray that passes through the center of the pupil of the image forming optical system 1, and an X-mark 104 indicates the position of an intermediate image that is a conjugate relation with an enlargement-side conjugate surface 101 or a reduction-side conjugate surface 102.

The image forming optical system 1 is applicable to an optical apparatus such as an imaging apparatus, projecting apparatus, or the like. In a case where the image forming optical system 1 is applied to an imaging apparatus as an imaging optical system (reduction system), an imaging surface (receiving surface) of an imaging element is situated at the position of the reduction-side conjugate surface 102 of the image forming optical system 1. In a case where the image forming optical system 1 is applied to a projecting apparatus as a projecting optical system (enlargement system), a display surface of a display element is situated at the position of the reduction-side conjugate surface 102 of the image forming optical system 1. The object side and image side is opposite between the imaging optical system and projecting optical system, and the optical path is backwards. A case assuming application of the image forming optical system 1 to an imaging apparatus is described below.

The image forming optical system 1 has a first optical system 111 that has reflecting surfaces and a second optical system 112 that has refracting surfaces, in order from the side of the enlargement-side conjugate surface 101 (enlargement side) toward the side of the reduction-side conjugate surface 102 (reduction side). The image forming optical system 1 forms an intermediate image 104 between the first optical system 111 and the second optical system 112. The first optical system 111 is made up of a first reflecting group 113 including a reflecting surface 115 that is disposed closest to the enlargement side and that has negative power, and a second reflecting group 114 including reflecting surfaces 116 and 117 that have positive power.

It should be noted that the power of the reflecting surfaces in the present embodiment indicates the degree of light collection by the reflecting surfaces, and is expressed by the inverse of the focal length of the reflecting surface. That is to say, the power of a reflecting surface corresponds to the power of a refracting surface (refractive force), and is proportionate to the curvature of the reflecting surface. In a case where the reflecting surface is convex, the sign of the power is negative, and in a case where the reflecting surface is concave, the sign of the power is positive. Also, the term reflecting group in the present embodiment means an assembly of one or more reflecting surface having power.

Thus, the first optical system 111 has a configuration where the reflecting surface 115 that has negative power is disposed closest to the enlargement side, so a wide angle can be realized without having to increase the size of the reflecting surface. The first optical system 111 also has a configuration where the reflecting surfaces 116 and 117 having positive power are disposed closer to the reduction side than the reflecting surface 115, so aberration occurring at the reflecting surface 115 and the second optical system 112 can be corrected. Specifically, distortion occurring at the reflecting surface 115 can be corrected by the reflecting surface 116, and curvature of field and distortion occurring at the second optical system 112 can be corrected by the reflecting surface 117. Thus, the image forming optical system 1 of the present embodiment can realize high optical capabilities while having a wide angle and being compact in size.

In the present embodiment, the first optical system 111 has positive power overall, the first reflecting group 113 has negative power, and the second reflecting group 114 has positive power. The first reflecting group 113 is made up of one reflecting optical element (convex mirror) including the convex reflecting surface 115, and the second reflecting group 114 is made up of two reflecting optical elements including the reflecting surfaces 116 and 117 that are both concave (concave mirrors)

It should be noted, however, that a configuration where the first reflecting group 113 has multiple reflecting surfaces, or a configuration where the second reflecting group 114 has three or more reflecting surfaces, may be made as necessary. At this time, in order to reduce aberration occurring at the first reflecting group 113 and the second reflecting group 114, preferably, the first reflecting group 113 is made up of only reflecting surfaces having negative power and the second reflecting group 114 is made up of only reflecting surfaces having positive power.

The second optical system 112 according to the present embodiment has one refracting optical element (lens) 118 that has positive power, and an aperture diaphragm AP for deciding the f-number of the image forming optical system 1. The second optical system 112 has positive power overall. Note that the aperture diaphragm AP is disposed farther toward the reduction side than the refracting optical element 118, but may be disposed toward the enlargement side as necessary. The second optical system 112 may also have multiple refracting optical elements as necessary. In such a case, the aperture diaphragm AP may be disposed between refracting optical elements.

The optical axis 121 of the second optical system 112 is decided by the refracting optical element 118 and the aperture diaphragm AP. Specifically, the optical axis 121 is an axis that passes through the center of curvature of the reflecting surfaces (lens faces) of the refracting optical element 118 and the center of the aperture diaphragm AP. That is to say, the optical axis 121 agrees with the axis of symmetry of rotation of the refracting surfaces. Note that in a case where the second optical system 112 has multiple refracting optical elements, at least one of part of the refracting optical elements and the aperture diaphragm AP may be decentered as necessary. In this case, the optical axis 121 may be an axis that passes through the greatest number of the centers of curvature and the center of the aperture diaphragm AP.

In the present embodiment, the aperture image $AP_{IMG}$ is formed between the reflecting surface 116 and the reflecting surface 117 in the second reflecting group 114. Thus, the astigmatism of the intermediate image 104 can be suitably corrected by disposing reflecting surfaces having positive power on each of the enlargement side and reduction side of the aperture image $AP_{IMG}$. Accordingly, correction of aberration by the second optical system 112 is facilitated, so the number of refracting optical elements can be reduced, and the size of the overall system can be made compact.

Even in a case where the second reflecting group 114 is made up of three or more reflecting surfaces, a configuration can be employed where the aperture image $AP_{IMG}$ is formed between two adjacent reflecting surfaces that have positive power. Also, a configuration may be made where multiple aperture images are formed as necessary, e.g., a configuration where an aperture image is formed not only on the optical path of the second reflecting group 114 but of the second optical system 112 as well.

Note that in the present embodiment, out of the reflecting surfaces that the second reflecting group 114 has, the effective region (the region where effective light fluxes contributing to image formation pass) of the reflecting surface 117 disposed closest to the reduction side preferably is aspherical. The reflecting surface 117 is the reflecting surface farthest away from the aperture image $AP_{IMG}$, i.e., the reflecting surface that is closest to the second optical system 112. Making this reflecting surface 117 to be aspherical enables the height of the rays incident to the second optical system 112 to be controlled, and distortion in the image forming optical system 1 can be suitably corrected. Note that in a case where the second reflecting group 114 has three or more reflecting surfaces, it is sufficient for at least the reflecting surface with positive power that is disposed closest to the reduction side to be aspherical, and other reflecting surfaces may also be aspherical as necessary.

Now, a method of disposing the reflecting surfaces closer to each other, in order to make the image forming optical system 1 to be further compact in size, is conceivable. However, reducing the spacing between the reflecting surfaces necessitates increased power of each reflecting surface, so correction of various aberrations at each reflecting surface will be more difficult. Accordingly, in addition to the reflecting surface 117, the reflecting surface 115 of the first reflecting group 113 is also aspherical in the present embodiment. Accordingly, the reflecting surface 115 can complement the effects of aberration correction by the reflecting surface 117 so various aberrations can be corrected suitably even in a case where the spacing between reflecting surfaces is reduced.

In a case where the first reflecting group 113 has multiple reflecting surfaces, the reflecting surface having negative power that is disposed closest to the enlargement side preferably is aspherical. The reason is rays are maximally separated from each other at the point of entering the reflecting surface disposed closest to the enlargement side (farthest away from the aperture image $AP_{IMG}$), so making this reflecting surface to be aspherical facilitates control of the light rays. Note however, that other reflecting surfaces of the first reflecting group 113 may be made aspherical as necessary.

The image forming optical system 1 according to the present embodiment preferably satisfies the following Conditional Expression (1)

$$0.35 \leq |Q_1/Q_2| \leq 0.80 \tag{1}$$

where $Q_1$ represents the maximal value of aspherical amount of the aspherical surface (asphere) of the first reflecting group 113, and $Q_2$ represents the maximal value of aspherical amount of the aspherical surface of the second reflecting group 114.

Satisfying Conditional Expression (1) enables various aberrations to be easily corrected at the aspherical surfaces, even in a case where the distance between reflecting surfaces is reduced. Below the lower limit of Conditional Expression (1), there is a possibility that correction of distortion by the aspherical surfaces will be difficult. Also, above the upper limit of Conditional Expression (1), there is a possibility that correction of various aberrations occurring at the reflecting surface 115 by the reflecting surface 116 will be difficult. Note that satisfying the following Conditional Expression (2)

$$0.42 \leq |Q_1/Q_2| \leq 0.70 \tag{2}$$

is even more preferable.

In general, negative distortion readily occurs in a refracting system (refracting group), so the power at peripheral portions of the reflecting surfaces preferably is smaller by making the aspherical amount of the reflecting surfaces to be negative. Accordingly, the height of the rays incident to the refracting system can be increased the more toward the peripheral portions, so negative distortion occurring at the refracting system can be suitably corrected. Accordingly, at least one of the following Conditional Expressions (3) and (4)

$$Q_1 < 0 \tag{3}$$

$$Q_2 < 0 \tag{4}$$

preferably is satisfied.

Also, the reflecting surface 115 disposed closest to the enlargement side in the first reflecting group 113 according to the present embodiment preferably is a reflecting surface having the smallest power. That is to say, the absolute value of power of the reflecting surface 115 preferably is the smallest in the first optical system 111. Accordingly, various aberrations occurring in the first optical system 111 and second optical system 112 can be corrected more suitably. Alternatively, the absolute value of power of the reflecting surface 115 (first reflecting surface) may be made to be greater than the absolute values of power of each of the reflecting surface 116 (second reflecting surface) disposed closest to the enlargement side in the second reflecting group 114 and the reflecting surface 117 (third reflecting surface) adjacent to the reflecting surface 116. Accordingly, an image forming optical system that is small but also has a wide angle can be realized.

Further, out of the reflecting surfaces that the second reflecting group 114 according to the present embodiment has, the reflecting surface 117 that is disposed closest to the reduction side preferably is a reflecting surface that has the greatest power. That is to say, the absolute value of power of the reflecting surface 117 preferably is the greatest in the first optical system 111. Accordingly, by appropriately setting the power of the reflecting surface 117 closest to the second optical system 112, astigmatism at the intermediate image 104 can be suitably corrected.

Also, at least one of the reflecting surfaces that the first optical system 111 has preferably has a form that is rotationally symmetrical as to the optical axis 121 of the second optical system 112. The first optical system 111 having a rotationally symmetrical reflecting surface enables positioning of that reflecting surface on the optical axis 121 to be facilitated. Note that the reflecting surfaces of the first optical system 111 do not intersect the optical axis 121 but all have forms that are rotationally symmetrical as to the optical axis 121, as illustrated in FIG. 2. That is to say, the reflecting surfaces can be thought to be a partial cutout of rotationally symmetrical reflecting surfaces having the center of curvature on the optical axis 121.

As described above, the image forming optical system 1 according to the present embodiment forms the intermediate image 104 between the first optical system 111 and the second optical system 112. Accordingly, the effective region on the reflecting surfaces and the refracting surfaces can be reduced in size, so the reflecting optical elements and the refracting optical elements can be reduced in size.

Further, the position at which the intermediate image 104 is formed is preferably displaced toward the reduction side spanning on-axis to off-axis, by setting the Petzval sum of the first optical system 111 to a negative value. Accordingly, curvature of field occurring due to the second optical system 112 can be cancelled out, so correction of aberration is easier over the entire system of the image forming optical system 1, and the number of refracting optical elements in the second optical system 112 can be reduced.

Specifically, the Petzval sum of the first optical system 111 is preferably smaller than −0.05 when the entire system of the image forming optical system 1 is normalized with the focal length as 1. Accordingly, curvature of field occurring due to the second optical system 112 can be corrected, and the incident angle of rays as to the second optical system 112 can be reduced, so the size of the refracting optical element closest to the intermediate image 104 in the second optical system 112 can be reduced. Further, the normalized Petzval sum of the first optical system 111 is even more preferably a value smaller than −0.07.

Also, an arrangement may be made where focus adjustment (focusing) of the image forming optical system 1 can be performed by providing a moving mechanism to move the entire second optical system 112 or the refracting optical element 118 alone along the optical axis direction. Accordingly, focusing can be performed suitably even in a case where the position of the enlargement-side conjugate surface 101, for example, has moved along the optical axis direction. Note that a holding member for movably holding the refracting optical element 118 and aperture diaphragm AP, and a driving member such as a motor or the like, can be used as the moving mechanism.

In a case where the second optical system 112 has multiple refracting optical elements, it is sufficient to have an arrangement where at least one refracting optical element, or at least one refracting optical element and the aperture diaphragm AP, can be moved. At this time, the amount of movement and direction of movement of the refracting optical elements and aperture diaphragm AP may differ from each other. Thus, employing a configuration where focusing is performed by moving the refracting optical elements enables the moving mechanism to be simplified as compared to a configuration where focusing is performed by moving reflecting optical elements, and the overall apparatus can be reduced in size.

Note that a prism may be used as a reflecting optical element in the first optical system 111 as necessary. Also, a reflecting optical element such as a mirror or the like may be disposed on the optical path of the second optical system 112, to make the image forming optical system 1 further compact in size. Further, an optical member such as a cover glass, protective film, or the like, may be disposed at any position on the optical path of the image forming optical system 1, as dust prevention measures.

Figure 3:
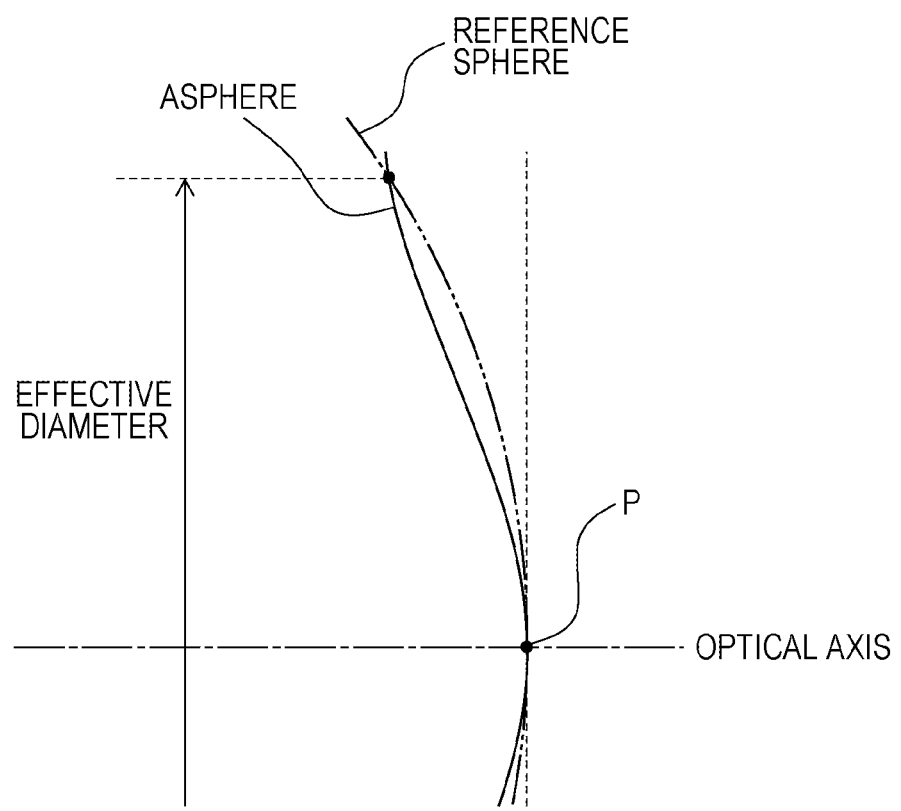
FIG. 3 is a diagram for describing a calculation method of power of an aspherical reflecting surface.
Figure 4:
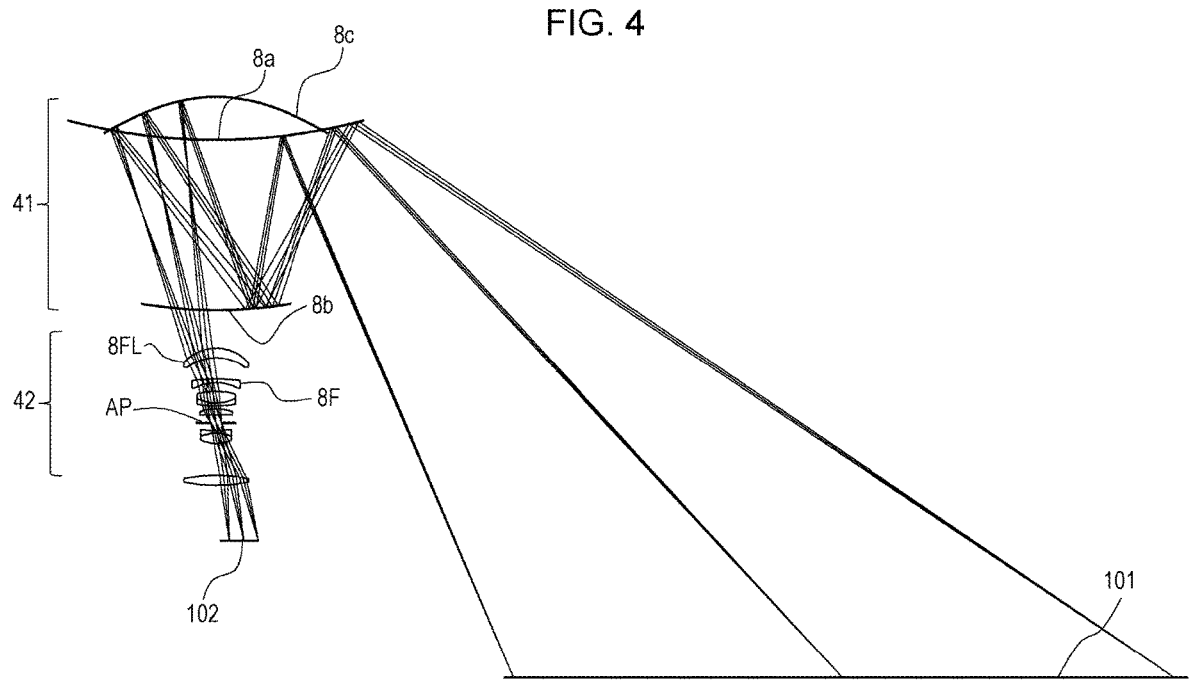
FIG. 4 is a schematic diagram of principal portions of the image forming optical system according to a first example of the present invention.
Figure 5:
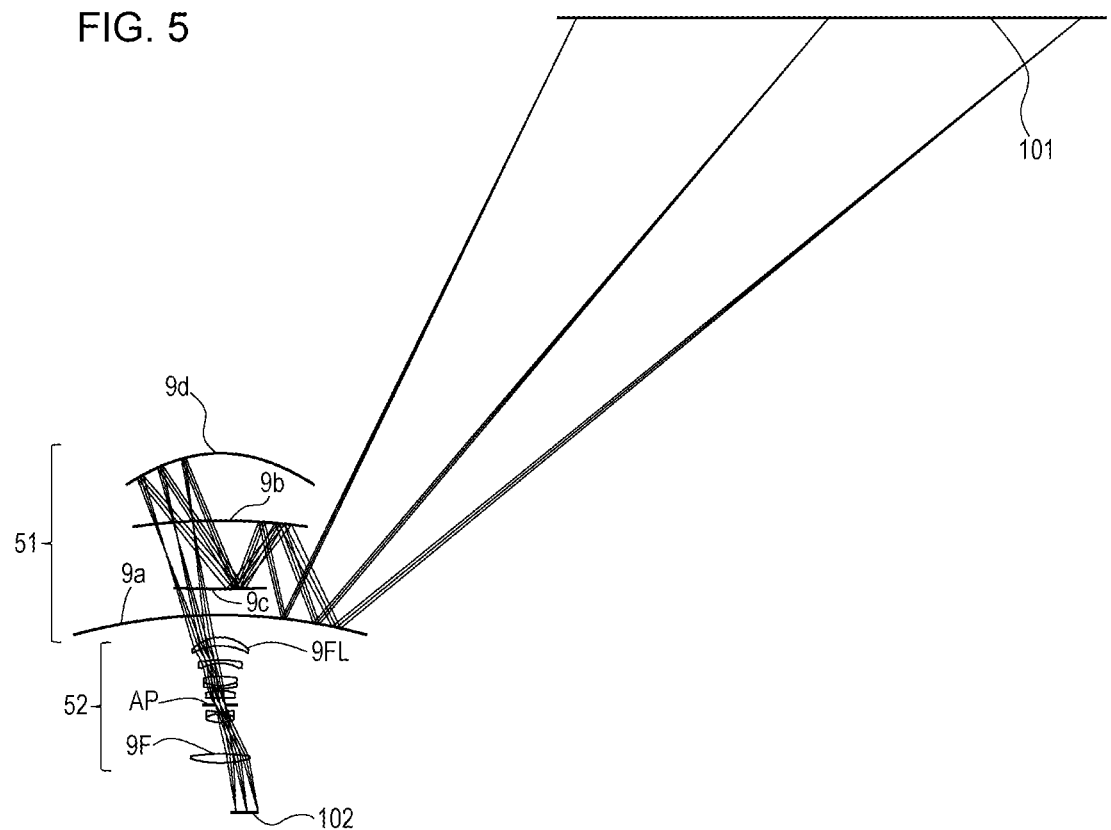
FIG. 5 is a schematic diagram of principal portions of the image forming optical system according to a second example of the present invention.
Figure 6:
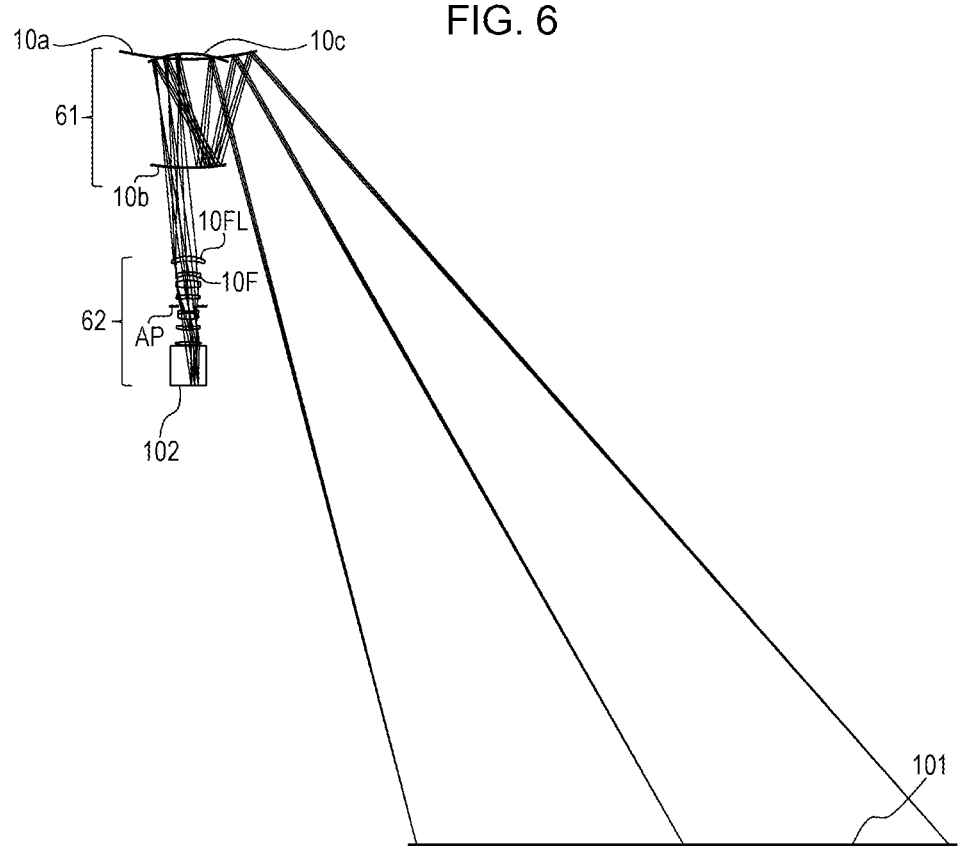
FIG. 6 is a schematic diagram of principal portions of the image forming optical system according to a third example of the present invention.
Figure 7:
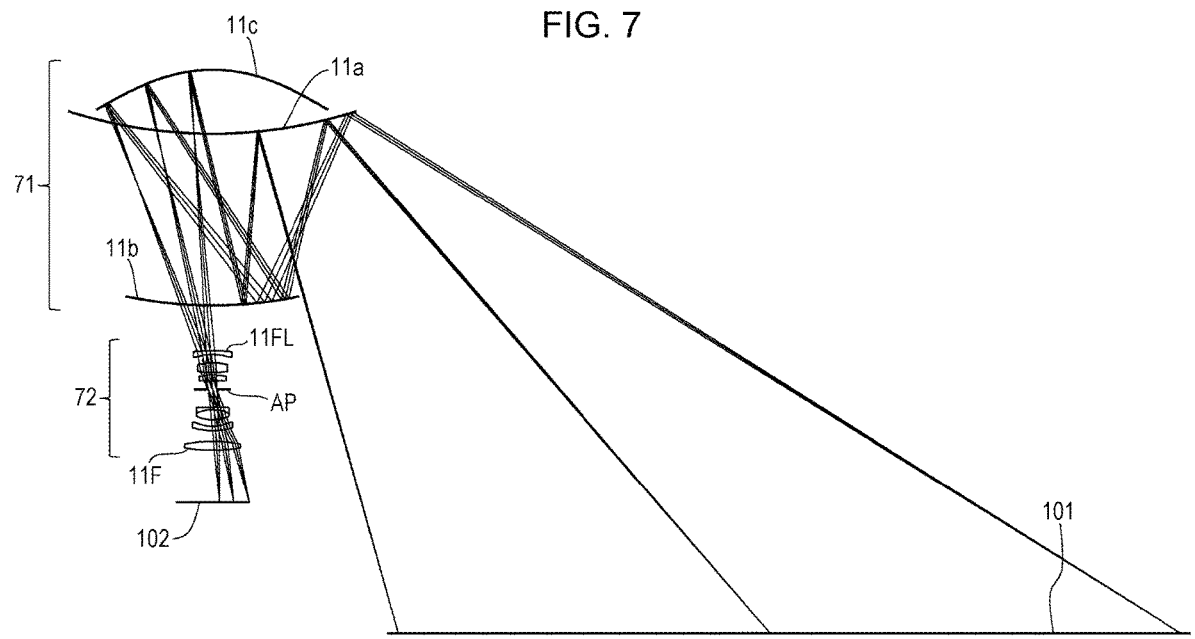
FIG. 7 is a schematic diagram of principal portions of the image forming optical system according to a fourth example of the present invention.

Now, in a case where the effective region of a reflecting surface in the first optical system 111 is an aspherical surface, a method for calculating the power of that reflecting surface will be described with reference to FIG. 3. First, in a case where the effective region of the reflecting surface is a rotationally symmetrical aspherical surface, the axis of symmetry of rotation is the optical axis, and a spherical surface of which the surface passes through a point on the optical axis (center point) and a point farthest away from the center point in the effective region and of which the center of curvature is on the optical axis, is a reference sphere. In a case where the effective region of a reflecting surface in the first optical system 111 is a free form face, an optional point P in the effective region is decided, and a perpendicular passing through a point P in a plane in contact with that point P, i.e., a normal of the effective region at point P, is the optical axis. A spherical surface of which the surface passes through the point P and a point farthest away from the point P in the effective region and of which the center is on the optical axis, is a reference sphere.

Thus, in a case where the effective region of the reflecting surface is aspherical, a reference sphere can be decided, and the power calculated based on that reference sphere. The effective diameter of the reference sphere can be calculated from the image forming magnification, f-number, greatest image height, and so forth, of the image forming optical system 1. The sign of the power of the reflecting surface can be judged to be positive or negative, depending on whether the reference sphere is concave or convex.

EXAMPLES

FIGS. 4 through 7 each are schematic diagrams of principal portions of the image forming optical system according to first through fourth examples of the present invention. First optical systems 41, 51, 61, and 71 respectively have a negative-power convex mirror 8a, 9a, 10a, 11a, making up a first reflecting group, and positive-power concave mirrors 8b, 8c, 9b, 9c, 9d, 10b, 10c, 11b, and 11c, making up a second reflecting group. Note that in FIGS. 4 through 7, non-effective regions on the reflecting surfaces (regions where effective light fluxes contributing to image forming do not enter) are illustrated without omission.

Also, second optical systems 42, 52, 62, and 72 respectively have a first group 8F, 9F, 10F, 11F, and second group 8FL, 9FL, 10FL, and 11FL. In the second optical system, the first group and second group are lens groups capable of moving in the optical axis direction. Adjusting the positions of these two lens groups enables focus adjustment and correction of curvature of field to be performed suitably.

In the image forming optical systems in the first through fourth examples, the reflecting surfaces 8c, 9d, 10c, and 11c, closest to the reduction side, are each aspherical. The image forming optical systems each control the height of rays incident to the second optical system by these aspherical surfaces, thereby suitably correcting distortion. Also, in the image forming optical systems in the first through fourth examples, all reflecting surfaces are rotationally symmetrical as to the optical axis of the second optical system. According to this configuration, positioning of the reflecting surfaces is facilitated, and simplification of the manufacturing processes of the image forming optical systems is realized.

Figure 8:
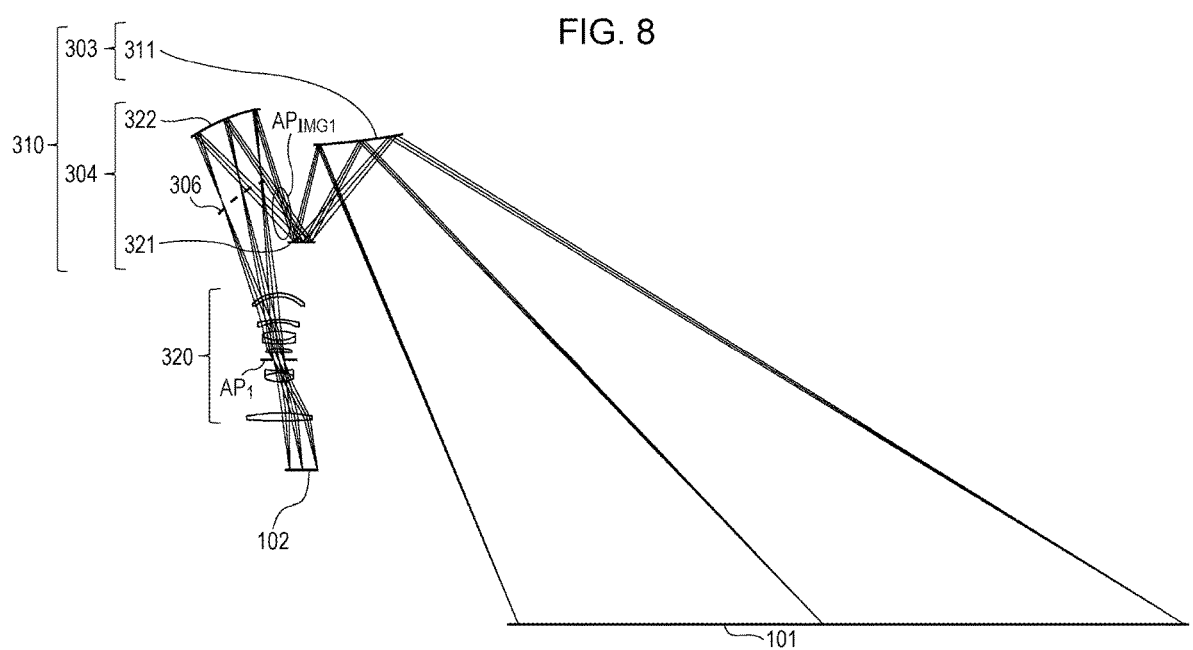
FIG. 8 is a schematic diagram of principal portions of the image forming optical system according to a fifth example of the present invention.
Figure 9:
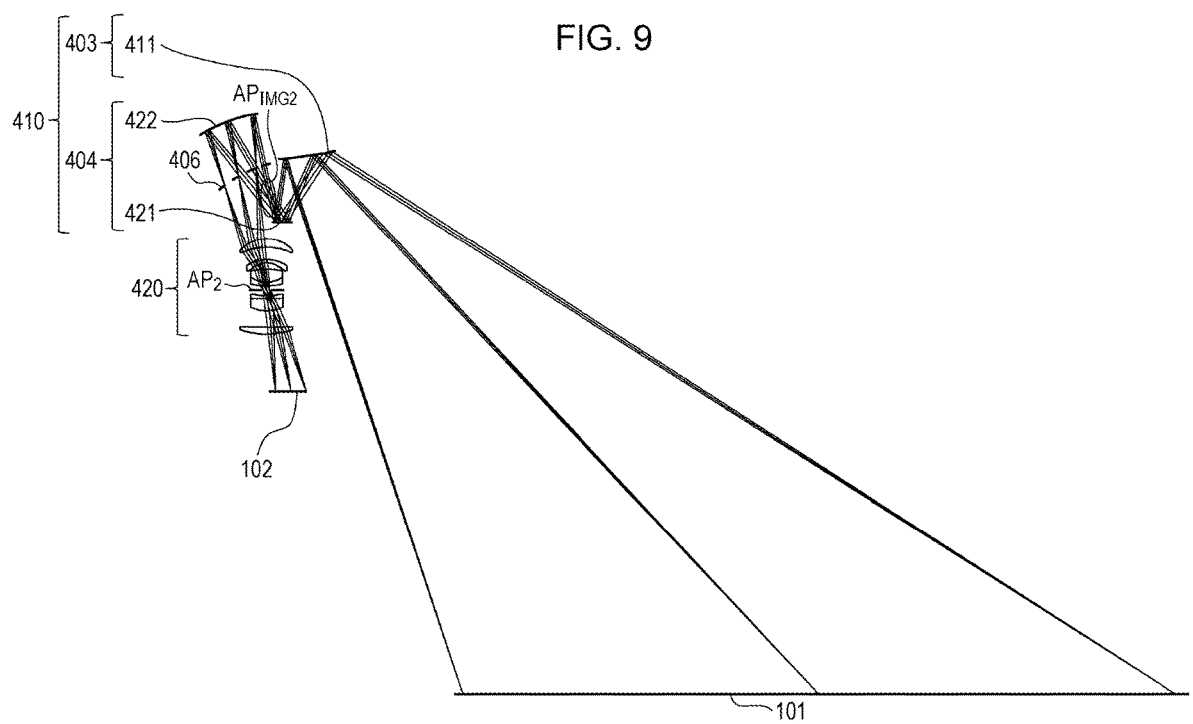
FIG. 9 is a schematic diagram of principal portions of the image forming optical system according to a sixth example of the present invention.
Figure 10:
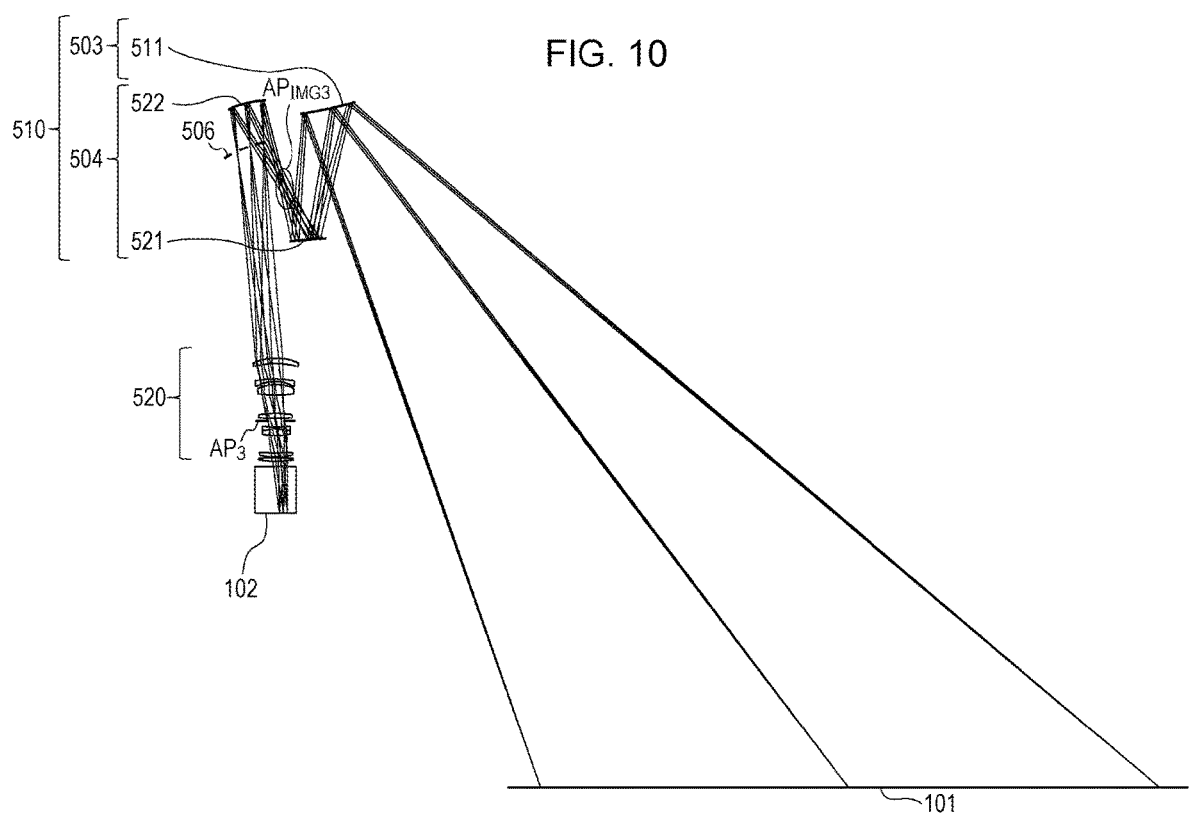
FIG. 10 is a schematic diagram of principal portions of the image forming optical system according to a seventh example of the present invention.

FIGS. 8 through 10 each are schematic diagrams of principal portions of the image forming optical system according to fifth through seventh examples of the present invention. The image forming optical systems illustrated in the examples respectively have first optical systems 310, 410, and 510 made up of a first reflecting group 303, 403, 503, and a second reflecting group 304, 404, 504, and a second optical system 320, 420, and 520. Each image forming optical system respectively forms an intermediate image 306, 406, and 506 of the enlargement-side conjugate surface 101 between the respective first optical system and respective second optical system.

The first reflecting groups 303, 403, and 503 respectively are made up of a negative-power convex mirror 311, 411, 511, and the second reflecting groups 304, 404, and 504 respectively are made up having positive power convex mirrors 321 and 322, 421 and 422, and 521 and 522. The second optical systems 320, 420, and 520 respectively are made up of an aperture diaphragm $AP_1$, $AP_2$, and $AP_3$, and multiple refracting optical elements. Aperture images $AP_{IMG1}$, $AP_{IMG2}$, and $AP_{IMG3}$, are respectively formed between concave mirrors in each of the second reflecting groups 304, 404, and 504.

In the image forming optical systems in the fifth through seventh examples, the reflecting surfaces 311 and 322, 411 and 422, and 511 and 522, are each aspherical. The image forming optical systems each control the height of rays incident to the second optical system 320, 420, and 520 by these aspherical surfaces, thereby suitably correcting distortion. Also, in the image forming optical systems in the examples, all reflecting surfaces are rotationally symmetrical as to the optical axis of the second optical system. According to this configuration, positioning of the reflecting surfaces is facilitated, and simplification of the manufacturing processes of the image forming optical systems is realized.

Figure 11:
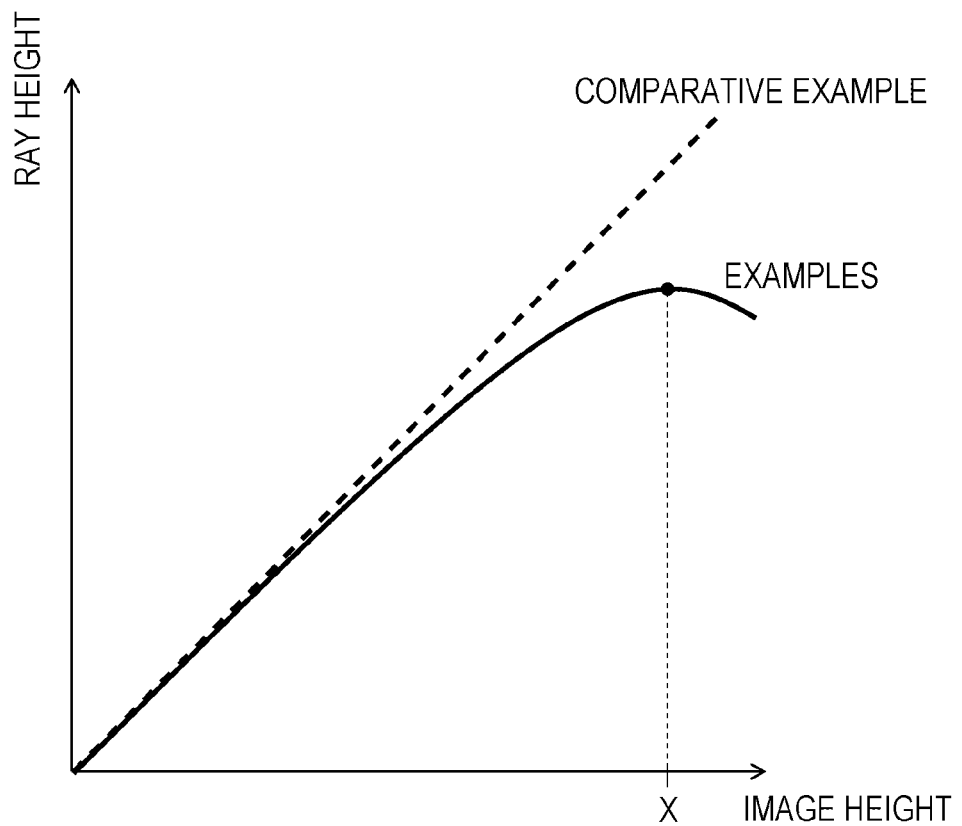
FIG. 11 is a diagram illustrating the relation between ray height at the reflecting surface and image height according to the examples.
Figure 12:
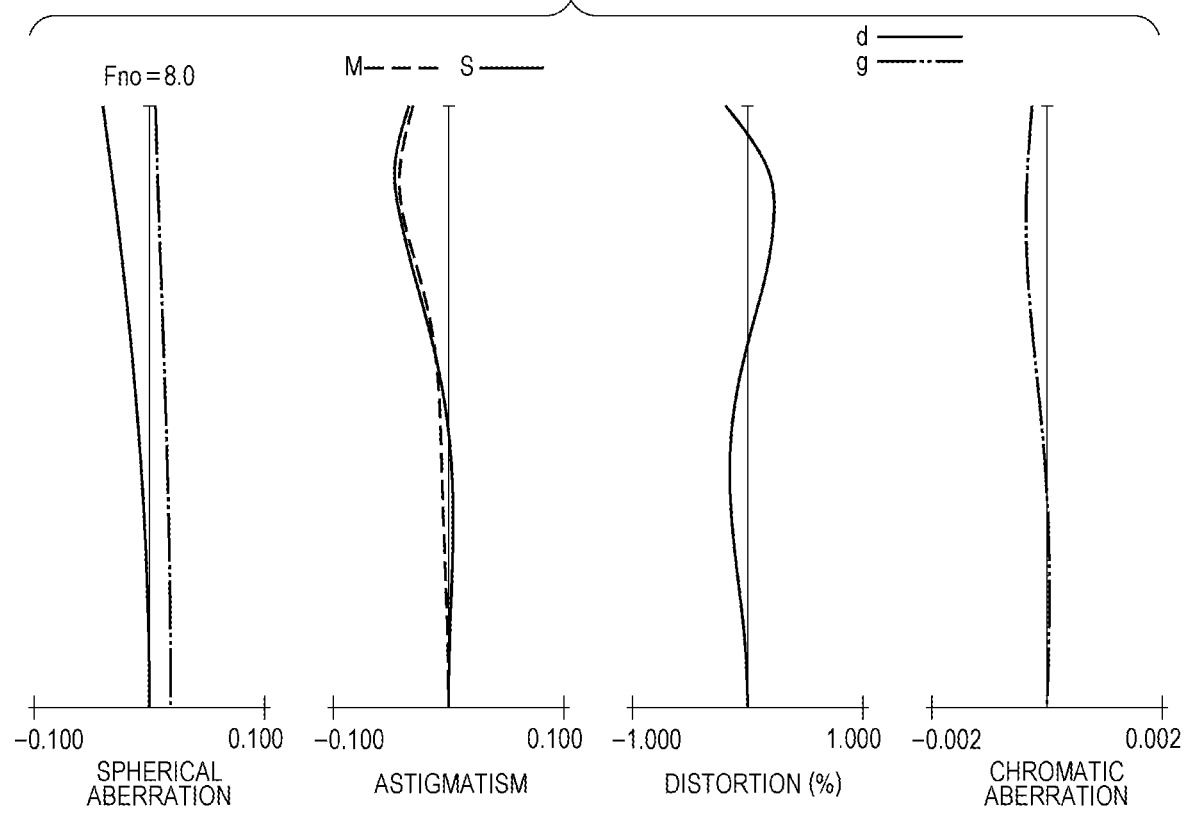
FIG. 12 is an aberration diagram of the image forming optical system according to the first example of the present invention.
Figure 13:
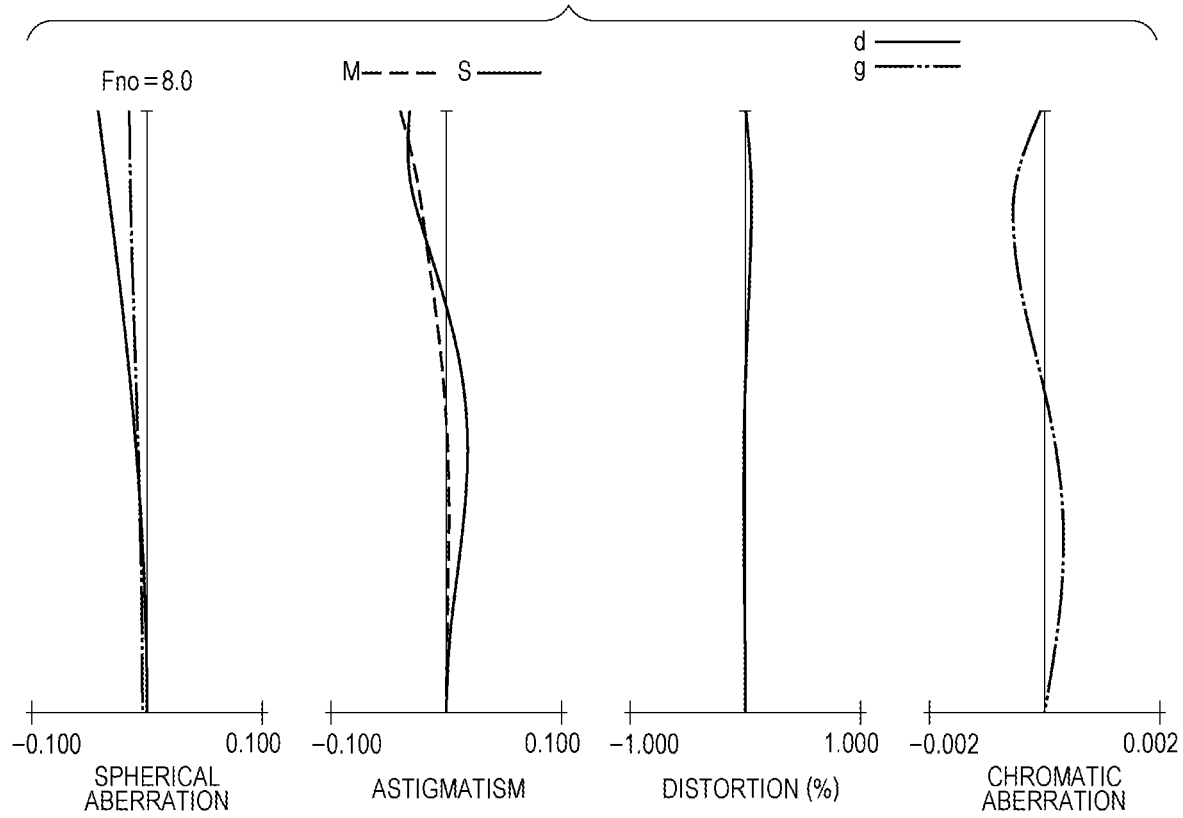
FIG. 13 is an aberration diagram of the image forming optical system according to the second example of the present invention.
Figure 14:
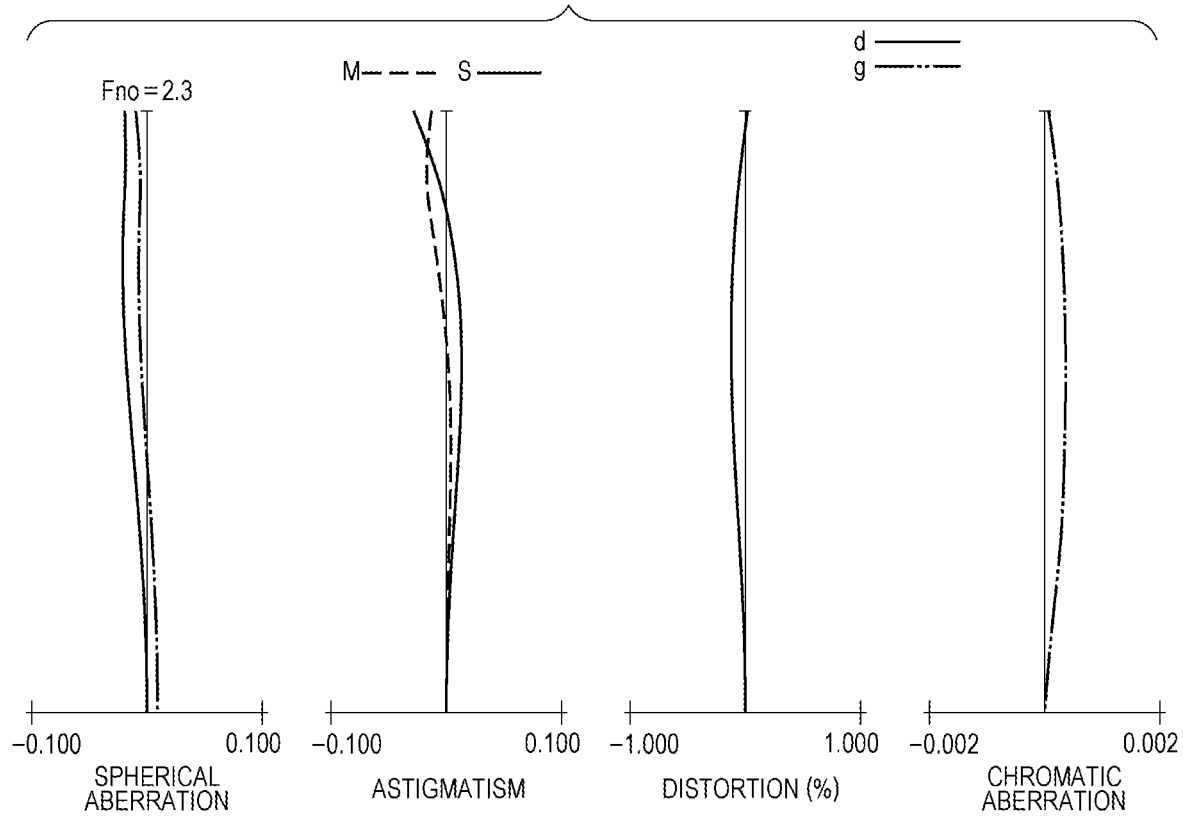
FIG. 14 is an aberration diagram of the image forming optical system according to the third example of the present invention.
Figure 15:
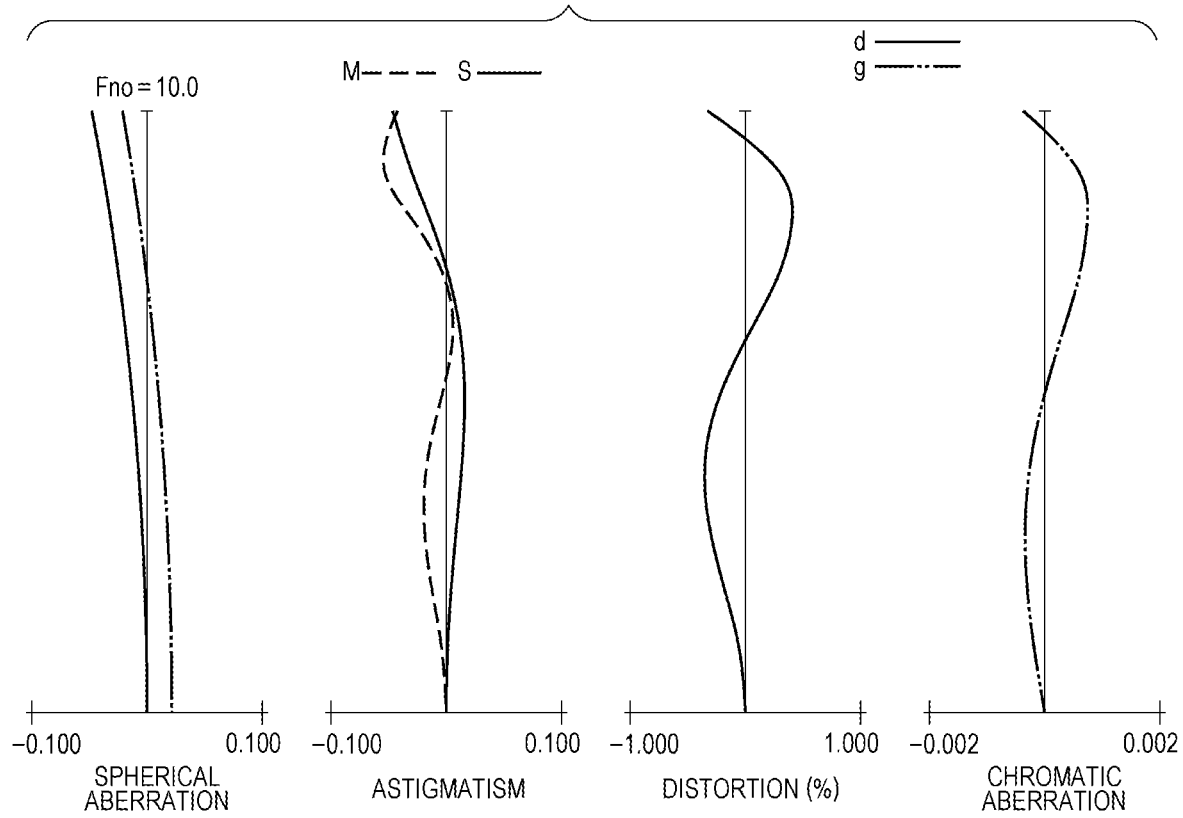
FIG. 15 is an aberration diagram of the image forming optical system according to the fourth example of the present invention.
Figure 16:
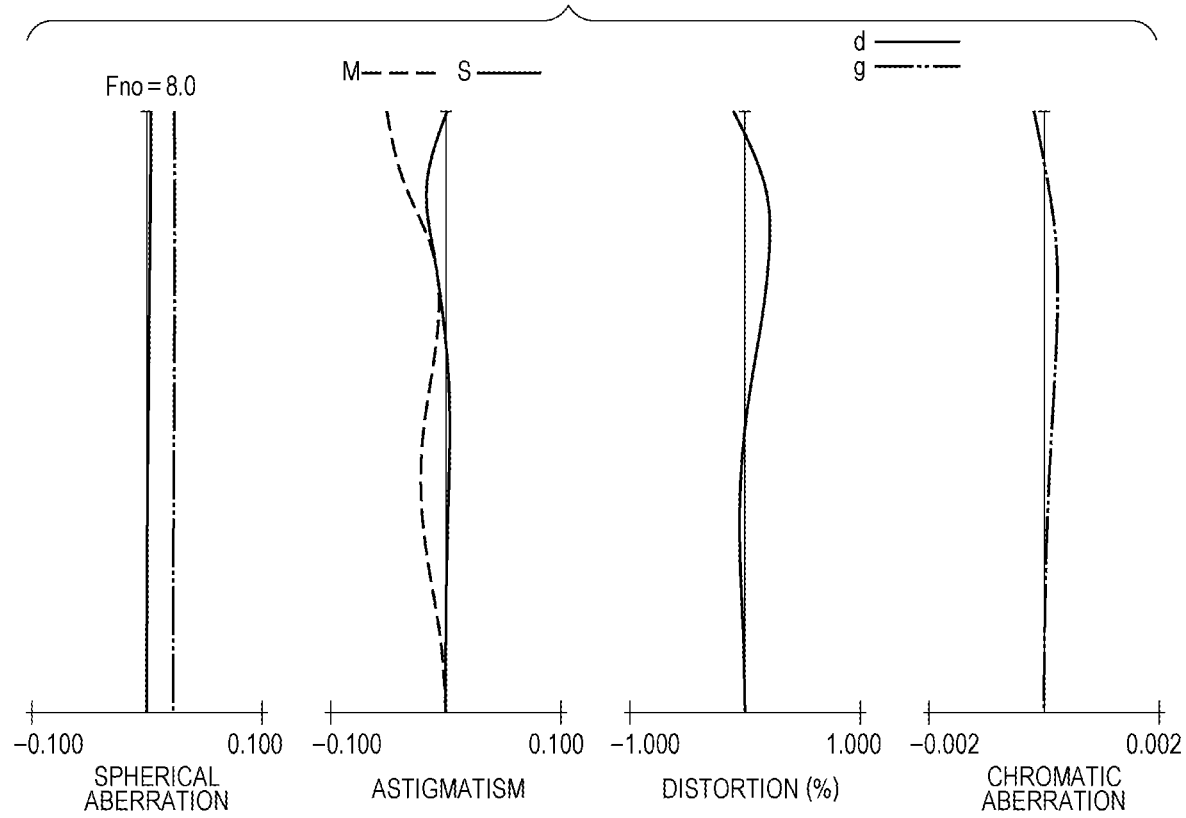
FIG. 16 is an aberration diagram of the image forming optical system according to the fifth example of the present invention.
Figure 17:
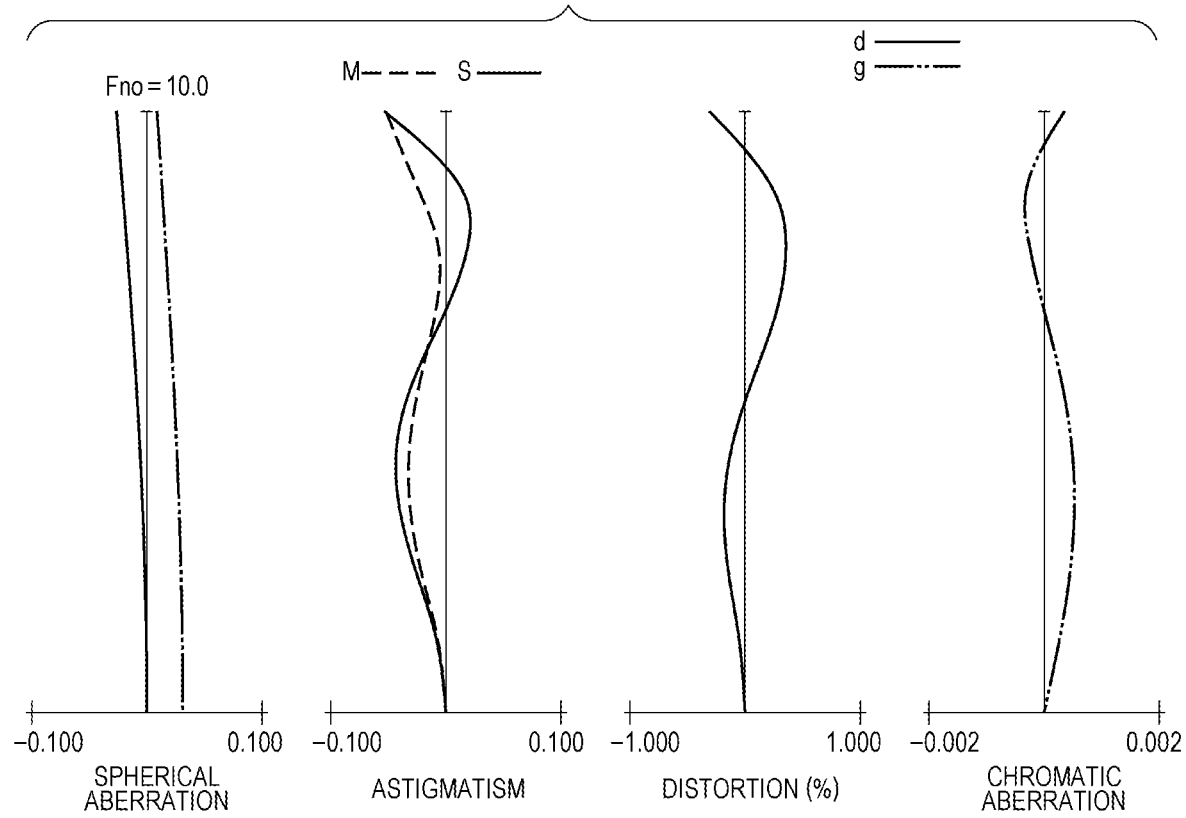
FIG. 17 is an aberration diagram of the image forming optical system according to the sixth example of the present invention.
Figure 18:
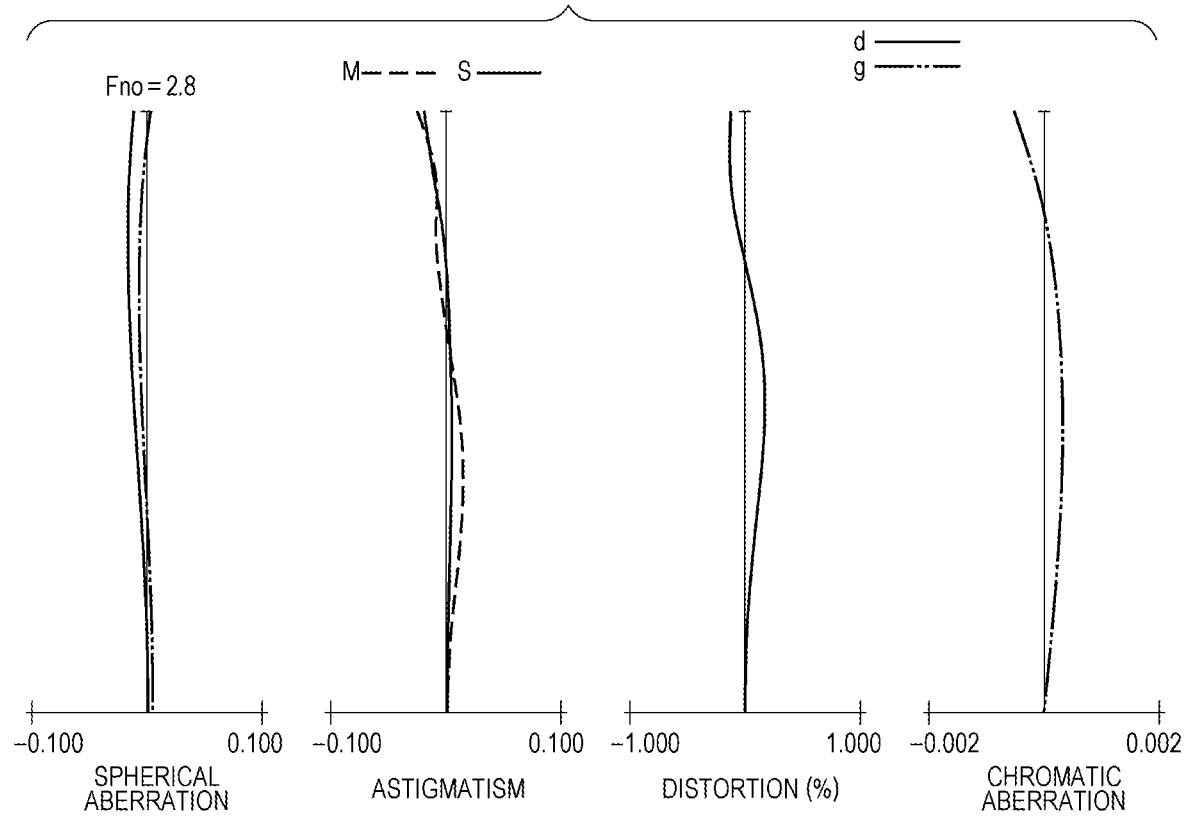
FIG. 18 is an aberration diagram of the image forming optical system according to the seventh example of the present invention.

The solid line in FIG. 11 indicates the relation between the distance from the optical axis of the second optical system to the position of incidence of the principal ray (ray height), and the image height of the principal ray corresponding to this position of incidence, at each of the reflecting surfaces 8b, 9c, 10b, 11b, 321, 421, and 521 according to the examples. The term principal ray as used here means, out of light fluxes from the object, a ray that passes through the intersection point of the optical axis of the second optical system and the aperture diaphragm (center of aperture). The broken line in FIG. 11 indicates the relation between the ray height at a reflecting surface and image height according to a comparative example.

As illustrated in FIG. 11, the relation between the ray height and image height is generally proportionate for the broken line, and the first derivative value is not 0 at any image height, but the first derivative value is 0 at image height X for the solid line. The image forming optical systems according to the examples have reflecting surfaces satisfying such a relation, whereby the ray height of off-axis light flux can be brought closer to the optical axis of the second optical system, and the reflecting surfaces can be further reduced in size.

The aspherical surfaces in the first through seventh examples realize a relation where the first derivative value is 0 at a certain image height for each of the reflecting surfaces 8b, 9c, 10b, 11b, 321, 421, and 521. In a case where an image forming optical system does not have an optical surface satisfying the above relation, such as in a case where a reflecting group does not have an aspherical surface, the ray height of off-axis flux remains away from the optical axis of the second optical system, so realization of further reduction in size of the reflecting surfaces becomes difficult.

Note that in order to realize reduction in size of the reflecting surfaces, it is sufficient for an image forming optical system to have at least one optical surface satisfying the above relation. That is to say, a configuration may be made where a reflecting surface or refracting surface other than the reflecting surfaces 8b, 9c, 10b, 11b, 321, 421, and 521 satisfies the above relation, or a configuration may be made where multiple optical surfaces satisfy the above relation.

It should be noted, however, that in order to obtain the effects of reduction in size of the reflecting surfaces, a reflecting surface in a reflecting group preferably satisfies the above relation in a configuration where an intermediate image is formed by a reflecting group, as in the image forming optical systems according to the first through seventh examples. Particularly, a configuration where the reflecting surface closest to the image of the aperture diaphragm at the second reflecting group (i.e., closest to the first reflecting group) satisfies the above relation, as in the above examples.

FIGS. 12 through 18 are aberration diagrams at the reduction-side conjugate surface of the image forming optical systems according to the first through seventh examples. The solid line in the spherical aberration drawing represents d ray and the double-dot dashed line represents g ray, the solid line in the astigmatism drawing represents sagittal ray and the dotted line represents meridional ray, the solid line in the distortion drawing represents d ray, and the double-dot dashed line in the chromatic aberration drawing represents g ray.

Numerical examples 1 through 7, corresponding to the respective image forming optical systems of the first through seventh examples, are shown in Tables 1 through 21. In the numerical examples, the face No. indicates the No. (i) of the optical surface as counted form the enlargement side, "R" indicates the radius of curvature of the i'th optical surface (face No. i), and "D" indicates the interface distance (distance on the optical axis) between face No. i and face No. i+1. Further, "$N_d$" and "$v_d$" respectively indicate the refractive index and Abbe number regarding the medium between face No. i and face No. i+1 as to d ray. Note that the Abbe number $v_d$ is represented as where the refractive indices regarding the medium between face No. i and face No. i+1 as to F ray and C ray are $N_F$ and $N_C$, respectively.

$$v_d = \frac{N_d - 1}{N_F - N_C}$$

Further, "f" represents focal length, "Fno" represents f-number at the reduction side, "β" represents image formation magnification, and "L" represents the distance from the outermost on-axis image height at the reduction-side conjugate surface to off-axis image height (position of incidence of outermost off-axis ray). Note that in the numerical examples, reflecting surfaces are indicated by "Refl"

following the face No., apertures are indicated by "AP" following the face No., and aspherical surfaces are indicated by an asterisk "*" following the face No.

The shape of an aspherical surface is represented as $$A(r) = \frac{r^2/R}{1+\sqrt{1-(1+K)r^2/R^2}} + C_4 r^4 + C_6 r^6 + C_8 r^8 + C_{10} r^{10}$$

where K is the conic constant, $C_4$, $C_6$, $C_8$, and $C_{10}$ are aspherical constants, r represents the height from the optical axis in direction perpendicular to the optical axis of the second optical system, and A(r) represents the surface position in the optical axis direction as to the center point (vertex) at the height r. Note that the "E-N" following the numerical values for the conic constant K and the aspherical constants $C_4$, $C_6$, $C_8$, and $C_{10}$ means "$\times 10^{-N}$".

Numerical Example 1

TABLE 1

| Face No. | | R | D | $N_d$ | $v_d$ |
|---|---|---|---|---|---|
| 1 | Refl | −395.56 | 117.03 | | |
| 2 | Refl | −306.07 | −146.53 | | |
| 3 * | Refl | 107.30 | 172.80 | | |
| 4 | | 29.24 | 6.76 | 1.613 | 44.30 |
| 5 | | 33.57 | 14.70 | | |
| 6 | | 119.24 | 2.54 | 1.806 | 40.92 |
| 7 | | 31.53 | 6.00 | | |
| 8 | | 50.21 | 8.00 | 1.595 | 67.74 |
| 9 | | −29.05 | 2.00 | 1.729 | 54.68 |
| 10 | | −80.18 | 1.94 | | |
| 11 | | 29.83 | 4.45 | 1.658 | 50.88 |
| 12 | | −3895.30 | 5.17 | | |
| 13 | AP | 0.00 | 5.55 | | |
| 14 | | −44.93 | 1.62 | 1.883 | 40.76 |
| 15 | | 26.03 | 7.06 | 1.487 | 70.23 |
| 16 | | −25.28 | 21.91 | | |
| 17 | | 110.73 | 6.90 | 1.606 | 43.70 |
| 18 | | −107.15 | 38.19 | | |

TABLE 2

| Face No. 3 | | | | |
|---|---|---|---|---|
| K | $C_4$ | $C_6$ | $C_8$ | $C_{10}$ |
| −9.533E−01 | −5.644E−08 | −3.912E−12 | −1.879E−16 | 3.003E−20 |

TABLE 3

| f | 21.14 |
|---|---|
| Fno | 8.0 |
| β | 0.044 |
| L | 29 |

Numerical Example 2

TABLE 4

| Face No. | | R | D | $N_d$ | $v_d$ |
|---|---|---|---|---|---|
| 1 | Refl | 422.65 | −72.38 | | |
| 2 | Refl | 476.68 | 52.38 | | |
| 3 | Refl | 816.51 | −103.91 | | |
| 4 * | Refl | 102.24 | 140.99 | | |
| 5 | | 29.35 | 6.55 | 1.606 | 43.70 |
| 6 | | 44.15 | 10.82 | | |
| 7 | | 93.26 | 2.50 | 1.883 | 40.76 |
| 8 | | 29.99 | 10.13 | | |
| 9 | | 77.36 | 7.01 | 1.595 | 67.74 |
| 10 | | 30.31 | 2.00 | 1.713 | 53.87 |
| 11 | | −80.04 | 1.60 | | |
| 12 | | 30.94 | 5.86 | 1.648 | 53.02 |
| 13 | | 741.59 | 5.17 | | |
| 14 | AP | 0.00 | 5.48 | | |
| 15 | | −39.62 | 1.50 | 1.883 | 40.76 |
| 16 | | 24.49 | 6.53 | 1.595 | 67.74 |
| 17 | | −27.38 | 24.14 | | |
| 18 | | 147.97 | 6.91 | 1.606 | 43.70 |
| 19 | | −79.05 | 37.77 | | |

TABLE 5

| Face No. 4 | | | | |
|---|---|---|---|---|
| K | $C_4$ | $C_6$ | $C_8$ | $C_{10}$ |
| −1.011E+00 | −3.638E−08 | −8.133E−14 | −2.389E−16 | 1.713E−20 |

TABLE 6

| f | 24.61 |
|---|---|
| Fno | 8.0 |
| β | 0.044 |
| L | 29 |

Numerical Example 3

TABLE 7

| Face No. | | R | D | $N_d$ | $v_d$ |
|---|---|---|---|---|---|
| 1 | Refl | −300.61 | 109.86 | | |
| 2 | Refl | −242.44 | −115.47 | | |
| 3 * | Refl | 86.27 | 204.98 | | |
| 4 * | | 33.57 | 4.75 | 1.654 | 39.70 |
| 5 * | | 51.32 | 11.24 | | |
| 6 | | 55.60 | 3.11 | 1.883 | 40.76 |
| 7 | | 25.18 | 5.23 | | |
| 8 * | | 40.78 | 7.41 | 1.595 | 67.74 |
| 9 * | | −82.03 | 7.10 | | |
| 10 | | 49.40 | 4.36 | 1.497 | 81.54 |
| 11 | | −154.34 | 7.12 | | |
| 12 | AP | 0.00 | 5.57 | | |

TABLE 7-continued

| Face No. | R | D | $N_d$ | $v_d$ |
|---|---|---|---|---|
| 13 | −37.82 | 1.49 | 1.883 | 40.76 |
| 14 | 33.38 | 6.27 | 1.595 | 67.74 |
| 15 | −42.53 | 7.52 | | |
| 16 | −52.89 | 3.50 | 1.606 | 43.70 |
| 17 | −38.17 | 11.97 | | |
| 18 | 129.40 | 3.10 | 1.713 | 53.87 |
| 19 | −61.06 | 0.95 | | |
| 20 | 0.00 | 40.00 | 1.516 | 64.14 |
| 21 | 0.00 | −0.01 | | |

TABLE 8

| K | $C_4$ | $C_6$ | $C_8$ | $C_{10}$ |
|---|---|---|---|---|
| | | Face No. 3 | | |
| −1.044E+00 | −3.448E−07 | 0.000E+00 | 0.000E+00 | 0.000E+00 |
| | | Face No. 4 | | |
| −1.119E−01 | 4.463E−08 | 2.543E−09 | 0.000E+00 | 0.000E+00 |
| | | Face No. 5 | | |
| 1.494E+00 | −3.147E−07 | 4.813E−09 | 0.000E+00 | 0.000E+00 |
| | | Face No. 8 | | |
| −3.806E−01 | −1.692E−07 | 1.487E−09 | 0.000E+00 | 0.000E+00 |
| | | Face No. 9 | | |
| 1.468E+01 | −1.616E−06 | −8.492E−10 | 0.000E+00 | 0.000E+00 |

TABLE 9

| f | 11.53 |
|---|---|
| Fno | 2.3 |
| β | 0.013 |
| L | 10 |

Numerical Example 4

TABLE 10

| Face No. | | R | D | $N_d$ | $v_d$ |
|---|---|---|---|---|---|
| 1 | Refl | −336.66 | 122.01 | | |
| 2 | Refl | −299.71 | −167.30 | | |
| 3* | Refl | 106.16 | 199.42 | | |
| 4 | | 137.88 | 2.50 | 1.806 | 40.92 |
| 5 | | 33.38 | 6.00 | | |
| 6 | | 44.47 | 7.00 | 1.595 | 67.74 |
| 7 | | −68.81 | 1.61 | | |
| 8 | | 40.38 | 4.01 | 1.658 | 50.88 |

TABLE 10-continued

| Face No. | | R | D | $N_d$ | $v_d$ |
|---|---|---|---|---|---|
| 9 | | 153.86 | 6.33 | | |
| 10 | AP | 0.00 | 12.69 | | |
| 11 | | −817.14 | 1.50 | 1.883 | 40.76 |
| 12 | | 26.76 | 7.23 | 1.497 | 81.54 |
| 13 | | −27.44 | 4.59 | | |
| 14 | | −28.44 | 3.12 | 1.806 | 40.92 |
| 15 | | −48.16 | 7.50 | | |
| 16 | | 93.00 | 6.38 | 1.606 | 43.70 |
| 17 | | −105.62 | 37.19 | | |

TABLE 11

| | | Face No. 3 | | |
|---|---|---|---|---|
| K | $C_4$ | $C_6$ | $C_8$ | $C_{10}$ |
| −9.239E−01 | −4.588E−08 | −6.780E−12 | 1.280E−16 | 1.310E−20 |

TABLE 12

| f | 17.86 |
|---|---|
| Fno | 10.0 |
| β | 0.038 |
| L | 26 |

Numerical Example 5

TABLE 13

| Face No. | | R | D | $N_d$ | $v_d$ |
|---|---|---|---|---|---|
| 1* | Refl | −378.03 | 72.26 | | |
| 2 | Refl | −473.05 | −102.08 | | |
| 3* | Refl | 92.71 | 139.97 | | |
| 4 | | 25.40 | 2.96 | 1.728 | 28.46 |
| 5 | | 25.36 | 17.43 | 1.000 | |
| 6 | | 55.55 | 2.00 | 1.728 | 28.46 |
| 7 | | 34.32 | 7.32 | 1.000 | |
| 8 | | 89.56 | 6.01 | 1.497 | 81.54 |
| 9 | | −27.21 | 3.00 | 1.834 | 37.16 |
| 10 | | −50.89 | 3.55 | 1.000 | |
| 11 | | 34.36 | 2.90 | 1.593 | 35.31 |
| 12 | | −149.81 | 5.00 | 1.000 | |
| 13 | AP | 0.00 | 8.64 | 1.000 | |
| 14 | | −63.19 | 2.25 | 1.834 | 37.16 |
| 15 | | 27.76 | 6.00 | 1.497 | 81.54 |
| 16 | | −36.50 | 23.82 | 1.000 | |
| 17 | | 90.56 | 6.00 | 1.762 | 40.10 |
| 18 | | −377.81 | | 1.000 | |

TABLE 14

| K | C4 | C6 | C8 | C10 | C12 |
|---|---|---|---|---|---|
| | | | Face No. 1 | | |
| −2.117E+01 | −9.184E−10 | 0.000E+00 | 0.000E+00 | 0.000E+00 | 0.000E+00 |
| | | | Face No. 3 | | |
| −1.007E+00 | −3.622E−08 | 0.000E+00 | 0.000E+00 | 0.000E+00 | 0.000E+00 |

TABLE 15

| | |
|---|---|
| f | 18.85 |
| Fno | 8.0 |
| β | 0.043 |
| L | 29.9 |

Numerical Example 6

TABLE 16

| Face No. | | R | D | $N_d$ | $v_d$ |
|---|---|---|---|---|---|
| 1* | Refl | −154.66 | 43.18 | | |
| 2 | Refl | −208.85 | −74.45 | | |
| 3* | Refl | 68.63 | 85.81 | | |
| 4 | | 23.71 | 6.43 | 1.569 | 56.36 |
| 5 | | 55.29 | 8.26 | 1.000 | |
| 6 | | 23.22 | 2.00 | 1.772 | 49.60 |
| 7 | | 14.60 | 4.00 | 1.000 | |
| 8 | | 29.03 | 10.00 | 1.595 | 67.74 |
| 9 | | −16.25 | 2.00 | 1.720 | 41.98 |
| 10 | | −61.17 | 3.35 | 1.000 | |
| 11 | AP | 0.00 | 3.05 | 1.000 | |
| 12 | | −53.94 | 2.50 | 1.728 | 28.46 |
| 13 | | −612.87 | 8.00 | 1.595 | 67.74 |
| 14 | | −26.03 | 11.64 | 1.000 | |
| 15 | | −357.37 | 5.15 | 1.583 | 59.38 |
| 16 | | −50.03 | | 1.000 | |

TABLE 17

| K | C4 | C6 | C8 | C10 | C12 |
|---|---|---|---|---|---|
| | | | Face No. 1 | | |
| −5.793E+00 | 1.411E−07 | −3.076E−11 | 2.764E−15 | −1.107E−19 | 0.000E+00 |
| | | | Face No. 3 | | |
| −5.897E−01 | −2.728E−07 | −7.190E−11 | 1.618E−14 | −1.765E−18 | 0.000E+00 |

TABLE 18

| | |
|---|---|
| f | 17.81 |
| Fno | 10.0 |
| β | 0.044 |
| L | 27.5 |

Numerical Example 7

TABLE 19

| Face No. | | R | D | $N_d$ | $v_d$ |
|---|---|---|---|---|---|
| 1* | Refl | −189.72 | 109.97 | | |
| 2 | Refl | −221.56 | −125.80 | | |
| 3* | Refl | 83.28 | 218.70 | | |
| 4* | | 34.24 | 5.57 | 1.883 | 40.76 |
| 5* | | 50.86 | 14.21 | 1.000 | |
| 6 | | 74.55 | 2.00 | 1.883 | 40.76 |
| 7 | | 25.21 | 2.31 | 1.000 | |
| 8* | | 33.99 | 10.46 | 1.595 | 67.74 |

TABLE 19-continued

| Face No. | | R | D | $N_d$ | $v_d$ |
|---|---|---|---|---|---|
| 9* | | −104.08 | 14.67 | 1.000 | |
| 10 | | 44.49 | 5.00 | 1.497 | 81.54 |
| 11 | | 451.42 | 2.82 | 1.000 | |
| 12 | AP | 0.00 | 5.83 | 1.000 | |
| 13 | | −43.67 | 1.38 | 1.883 | 40.76 |
| 14 | | 34.50 | 6.00 | 1.595 | 67.74 |
| 15 | | −36.76 | 15.07 | 1.000 | |
| 16 | | −120.31 | 4.14 | 1.606 | 43.70 |
| 17 | | −51.65 | −0.01 | 1.000 | |
| 18 | | 170.50 | 4.00 | 1.713 | 53.87 |
| 19 | | −62.80 | 3.96 | 1.000 | |
| 20 | | 0.00 | 40.00 | 1.516 | 64.14 |
| 21 | | 0.00 | 0.00 | 1.000 | |

TABLE 20

| K | C4 | C6 | C8 | C10 | C12 |
|---|---|---|---|---|---|
| Face No. 1 | | | | | |
| −1.813E+00 | 1.084E−08 | −1.190E−12 | −1.026E−16 | −9.909E−21 | 4.067E−24 |
| Face No. 3 | | | | | |
| −8.852E−01 | −3.962E−07 | 0.000E+00 | 0.000E+00 | −1.340E−17 | 4.737E−21 |
| Face No. 4 | | | | | |
| 0.000E+00 | −1.068E−06 | 9.028E−10 | 0.000E+00 | 0.000E+00 | 0.000E+00 |
| Face No. 5 | | | | | |
| −9.733E−01 | −3.037E−07 | 3.296E−09 | 0.000E+00 | 0.000E+00 | 0.000E+00 |
| Face No. 8 | | | | | |
| −3.440E−01 | −6.327E−07 | 6.008E−09 | 4.187E−12 | 0.000E+00 | 0.000E+00 |
| Face No. 9 | | | | | |
| 0.000E+00 | −3.044E−06 | 4.303E−10 | −1.180E−11 | 0.000E+00 | 0.000E+00 |

TABLE 21

| | |
|---|---|
| f | 8.57 |
| Fno | 2.8 |
| β | 0.013 |
| L | 10.0 |

Table 22 shows the value of the middle term in the above-described Conditional Expression (1), and the normalized Petzval sum Psum of the first optical system in the numerical examples 5 through 7.

TABLE 22

| | Example 5 | Example 6 | Example 7 |
|---|---|---|---|
| Q1/Q2 | 0.615 | 0.519 | 0.452 |
| Psum | −0.387 | −0.459 | −0.193 |

Optical Apparatus

Figure 19:
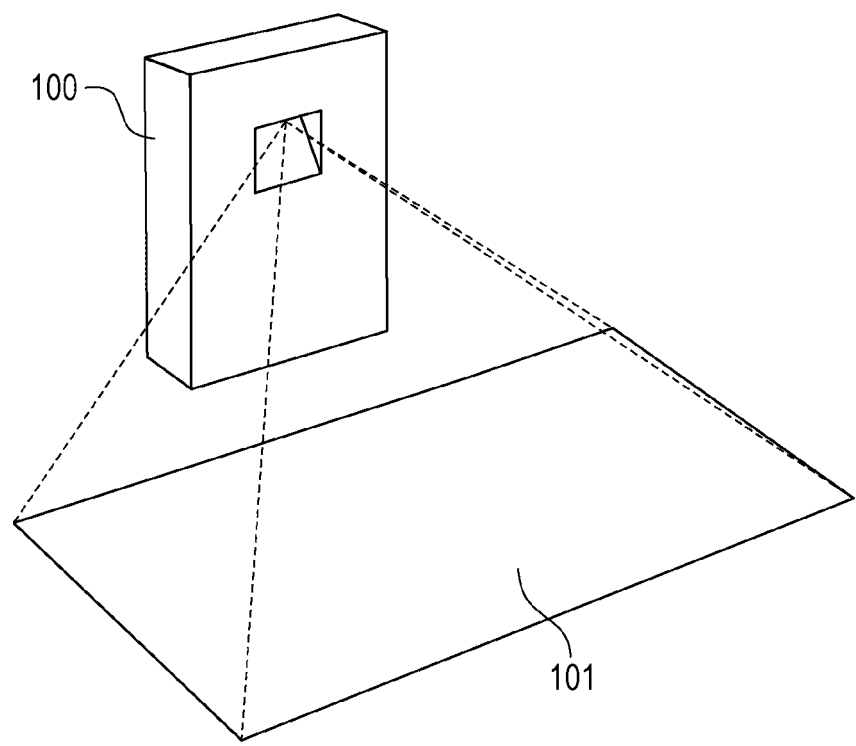
FIG. 19 is a schematic diagram of principal portions of an optical apparatus according to an embodiment of the present invention.

FIG. 19 is a schematic diagram of principal portions of an optical apparatus 100 having the image forming optical system according to the above-described embodiment. In a case where the optical apparatus 100 is an imaging apparatus, a subject on a placement surface disposed at the enlargement-side conjugate surface 101 can be imaged by an imaging element disposed at the position of the reduction-side conjugate surface of the image forming optical system. Examples of the imaging element that can be used include a charge coupled device (CCD) sensor, complementary metal oxide semiconductor (CMOS) sensor, and so forth.

In a case where the optical apparatus 100 is a projecting apparatus, an image displayed by a display element disposed at the position of the reduction-side conjugate surface of the image forming optical system can be projected onto a projection surface disposed at the enlargement-side conjugate surface 101. Examples of the display element that can be used include a liquid crystal display (LCD), a liquid crystal on silicon (LCoS) device, a digital mirror device (DMD), and so forth.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image forming optical system, comprising, in order from an enlargement side:
a first optical system having a reflecting surface; and
a second optical system having a refracting surface,
wherein the image forming optical system is configured to form an intermediate image between the first optical system and the second optical system,
wherein the first optical system includes, in order from the enlargement side, a first reflecting group having at least one reflecting surface having negative power, and a second reflecting group having a plurality of reflecting surfaces having positive power,
wherein the at least one reflecting surface having negative power includes a reflecting surface closest to the enlargement side in the first reflecting group, and
wherein an absolute value of power of the reflecting surface closest to the enlargement side in the first reflecting group is smallest in the first optical system.

2. The image forming optical system according to claim 1, wherein the second optical system includes an aperture diaphragm.

3. The image forming optical system according to claim 2, wherein the reflecting surfaces having positive power in the second reflecting group include a reflecting surface disposed on the enlargement side of an image of the aperture diaphragm and a reflecting surface disposed on a reduction side of the image of the aperture diaphragm.

4. The image forming optical system according to claim 1, wherein a reflecting surface having positive power disposed closest to a reduction side in the second reflecting group is an aspherical surface.

5. The image forming optical system according to claim 4, wherein at least one reflecting surface having negative power in the first reflecting group includes an aspherical surface.

6. The image forming optical system according to claim 4, wherein the reflecting surface closest to the enlargement side in the first reflecting group is an aspherical surface.

7. The image forming optical system according to either claim 5, wherein the second optical system includes an aperture diaphragm, and in each of the first reflecting group and the second reflecting group, the aspherical surfaces are disposed at positions farthest away from an image of the aperture diaphragm.

8. The image forming optical system according to claim 5, wherein the following conditional expression is satisfied:

$0.35 \leq |Q_1/Q_2| \leq 0.80$, where $Q_1$ represents a maximal value of aspherical amount of the aspherical surface in the first reflecting group, and $Q_2$ represents a maximal value of aspherical amount of the aspherical surface in the second reflecting group.

9. The image forming optical system according to claim 8, wherein the following conditional expression is satisfied:

$Q_1 < 0$.

10. The image forming optical system according to claim 8, wherein the following conditional expression is satisfied: $Q_2 < 0$.

11. The image forming optical system according to claim 1, having an optical surface where a first derivative value of a relation between a distance from an optical axis of the second optical system to a position of incidence of a principal ray, and an image height of the principal ray corresponding to the position of incidence, is 0 at a certain image height.

12. The image forming optical system according to claim 11, wherein the optical surface is a reflecting surface in the first optical system.

13. The image forming optical system according to claim 12, wherein the second optical system includes an aperture diaphragm, and the optical surface is an reflecting surface closest to an image of the aperture diaphragm in the second reflecting group.

14. The image forming optical system according to claim 1, wherein the first reflecting group has negative power, and the second reflecting group has positive power.

15. The image forming optical system according to claim 1, wherein an absolute value of power of a reflecting surface closest to a reduction side in the second reflecting group is largest in the first optical system.

16. The image forming optical system according to claim 1, wherein, when a focal length of the image forming optical system is 1, a Petzval sum of the first optical system is smaller than −0.05.

17. The image forming optical system according to claim 1, wherein the first optical system has a reflecting surface that is rotationally symmetrical as to an optical axis of the second optical system.

18. An imaging apparatus, comprising:

the image forming optical system according to claim 1; and an imaging element having an imaging surface disposed at a reduction-side conjugate surface of the image forming optical system.

19. A projecting apparatus, comprising:

the image forming optical system according to claim 1; and a display element having a display surface disposed at a reduction-side conjugate surface of the image forming optical system.

* * * * *